Patented Aug. 1, 1933

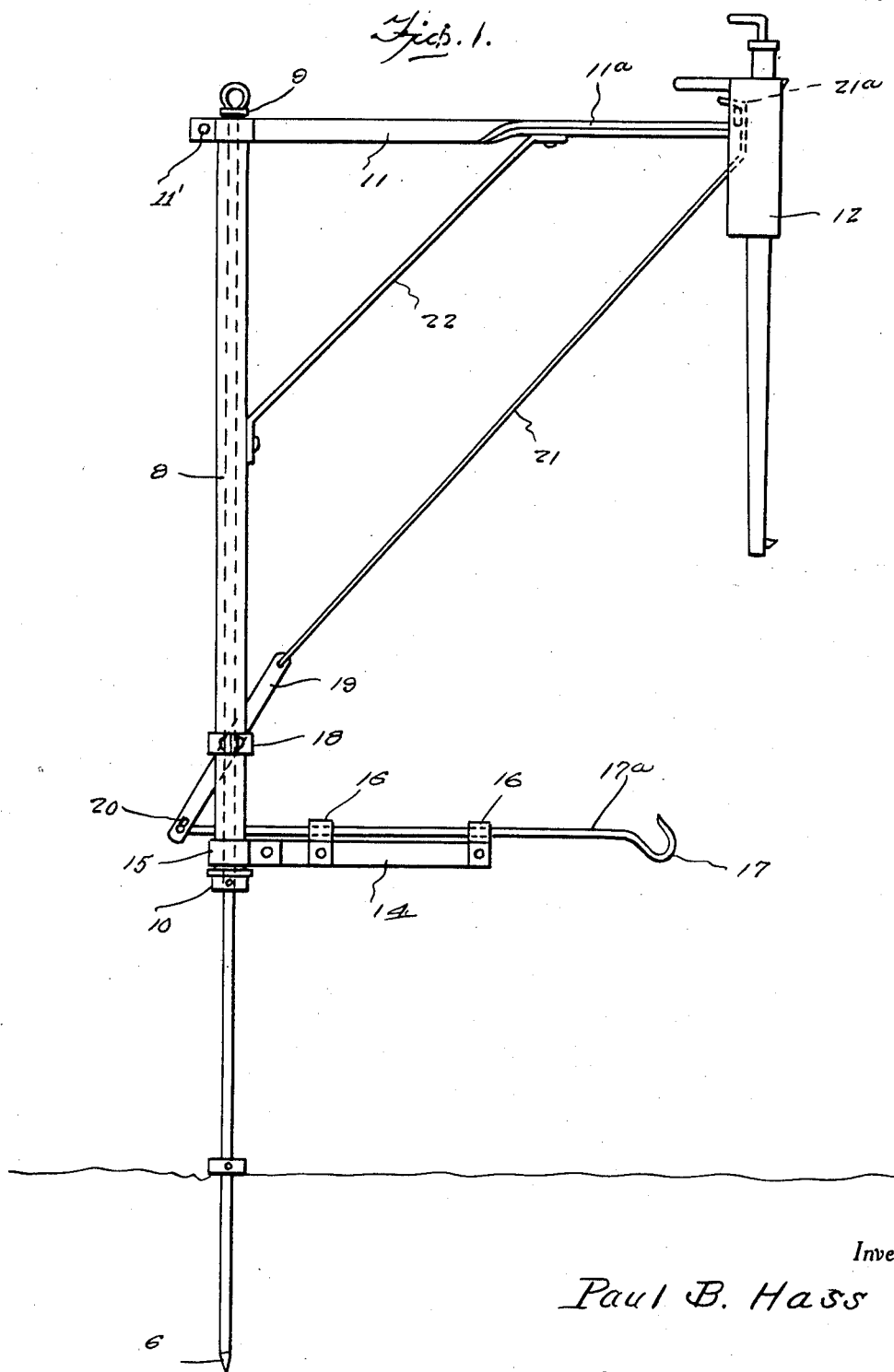

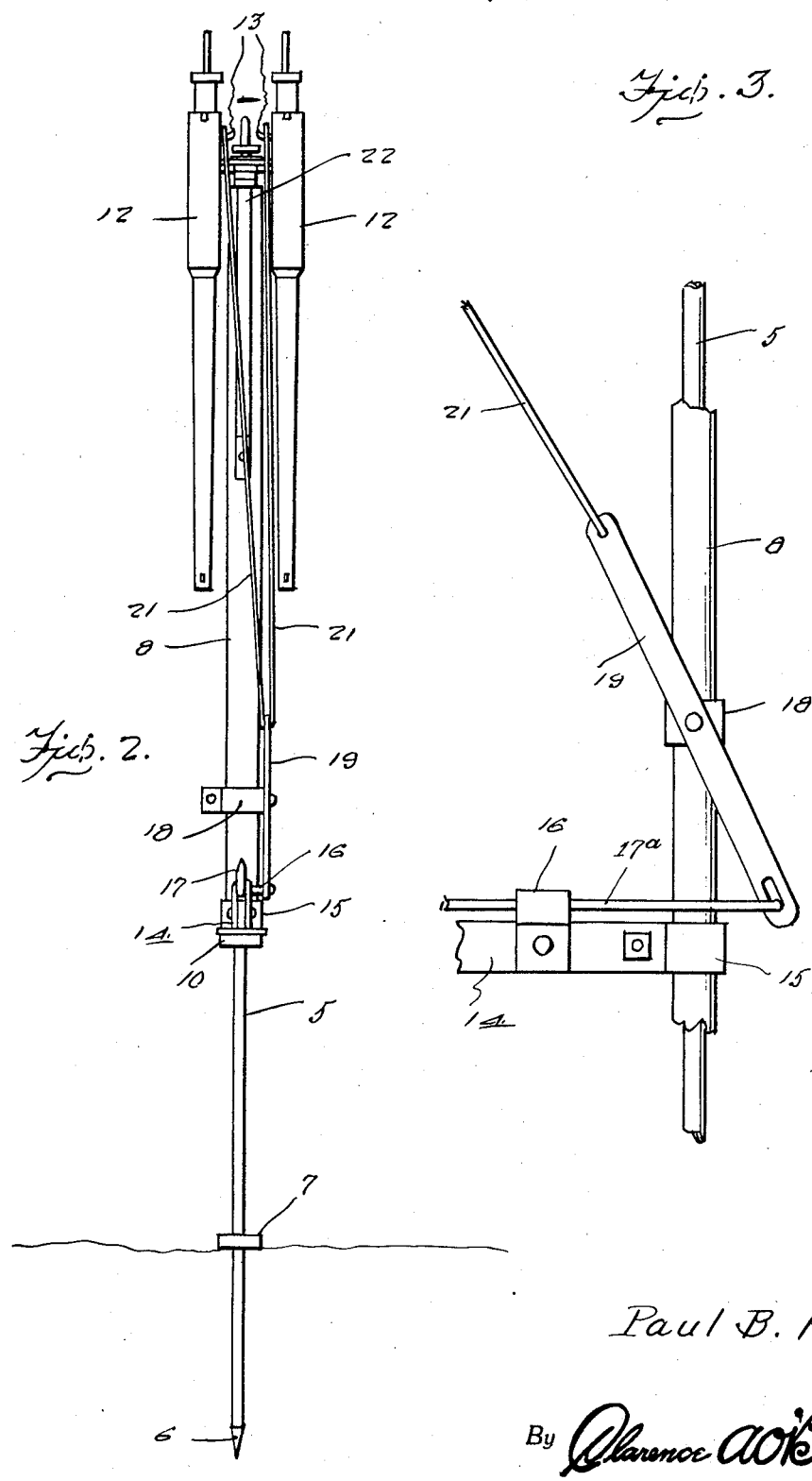

1,920,695

UNITED STATES PATENT OFFICE 1,920,695

TRAP GUN

Paul B. Hass, Chamberlain, S. Dak.

Application May 9, 1932. Serial No. 610,192

3 Claims. (Cl. 43—84)

This invention relates to trap guns used for gaming purposes and especially for trapping and killing fur bearing animals.

As is well known trap guns are mounted on tree trunks or in other advantageous positions in a loaded and cocked condition and suitable means including a lure or bait is operatively connected with the trigger of the gun so that the animal in attempting to secure the bait causes the gun to be fired resulting in a wounding or killing of the animal. At the present time these guns are fixedly mounted with the result that often times when the gun is fired the animal is not in the direct line of fire and as a result either escapes full injury or is only partly injured or wounded and consequently is free to escape.

In accordance with the present invention, means is provided for mounting the trap gun to rotate about a fixed axis in response to the pull exerted by the animal in attempting to dislodge the bait with the result that the animal whether pulling to the right or left will be in the line of fire and consequently so severely wounded as to prevent escape or is killed.

Further the invention comprehends the provision of what may be termed a double barrel trap gun both barrels of which will be fired simultaneously.

The invention together with its numerous objects and advantages will be best understood from a study of the following description, taken in connection with the accompanying drawings wherein:

Figure 1 is a side elevational view of the trap gun.

Figure 2 is a front elevational view thereof, and

Figure 3 is a fragmentary elevational view showing the means for operatively connecting the bait impaling hook with a trigger actuating link.

Referring more in detail to the drawings it will be seen that in accordance with the present invention, there is provided a stake rod 5 that has a pointed or sharpened end 6 to facilitate driving one end of the stake into the ground and perpendicular thereto. Adjacent the end 6 the stake rod 5 is provided with a collar 7 that is adjustable on the rod for controlling the earth penetrating depth of the stake rod. Rotatably mounted on the upper portion of the stake rod 5 is an elongated tube or sleeve 8 supported on the rod between collars 9 and 10.

Mounted on the upper end of the sleeve 8 and extending laterally therefrom is a bracket arm 11 that at one end is clamped about the sleeve 8 as at 11'. At its free end the arm 11 merges into a pair of coextensive arm extensions 11a and suitably supported on the outer ends of the said extensions 11a are vertically disposed trap guns 12 having the barrels thereof disposed downwardly. The trap guns 12 are of conventional construction and include among other parts triggers 13.

A guide arm 14 extends parallel to the arm 11 and is clamped at one end as at 15 about the sleeve 8 adjacent the lower end of the sleeve. Arm 14 is equipped with a pair of spaced guide loops 16 which slidably support the shank 17a of a bait impaling hook 17. Adjustably mounted on the sleeve 8 above the arm 14 is a collar 18 and pivoted to the collar is a lever 19. The lever 19 at one end thereof is provided with a slot 20, and the free end of shank 17a of hook 17 is suitably formed to engage the said slot. Links 21 are engaged at one end with the free end of the lever 19 and each of the links 21 at its free end is suitably hook shaped or otherwise formed as at 21a to engage over a trigger 13 as suggested in Figures 1 and 2. Preferably the links 21 are formed from a single length of wire that is passed through an aperture in the end of the lever 19 and then bent to provide parallel end portions terminating in the hook terminals 21a engaging the triggers 13.

The end extensions 11a of arm 11 are suitably braced with respect to the sleeve 8 through the medium of a diagonal brace rod 22.

In actual practice the end 6 of the rod 5 is driven into the ground at any suitable location, the guns 12 are loaded and cocked, and hook 17 is baited, and with the parts as shown in the drawings it is apparent that an animal attempting to reach or remove the bait from the hook 17 will exert a pull on the hook in a direction away from the sleeve 8 thus rocking the link 19 in a counter clockwise direction with the result that a downward pull is exerted on the links 21 whereby the triggers 13 are tripped or released resulting in a firing of the guns 12 directly downward upon the animal. It is apparent that the sleeve 8 being free to rotate on rod 5, the guns 12 will follow the animal and maintain a "bead" on the animal whether the animal in his attempt to remove the bait pulls either to the right or left, and as a result with both guns firing simultaneously the possibility of the animal escaping a mortal wound is very remote.

Even though I have herein shown and described the preferred embodiment of the invention, it is to be understood that the same is susceptable of further changes, modifications and improvements coming within the scope of the appended claims.

Having thus described my invention, what I claim as new is:

1. In a trap gun, a stake rod having an end adapted to be driven into the ground, an elongated sleeve mounted on the upper portion of said rod for rotation about the longitudinal axis of the rod, a supporting arm extending from said sleeve adjacent the upper end thereof, a trap gun proper supported on the outer end of said arm and having the barrel thereof disposed straight downward, a lever pivotally supported on said sleeve adjacent the lower end thereof, a link pivotally connected with said lever at one end and having a free end formed to engage the trigger of the trap gun proper, a guide arm extending laterally from the sleeve adjacent the lower end of the sleeve, a bait impaling hook including a shank mounted on said guide member slidable longitudinally thereof and pivotally connected with said lever whereby upon shifting of said bait hook said lever will be rotated for tripping the trigger of the trap gun.

2. In combination, a stake rod, a bracket arm mounted on said rod for rotation about the longitudinal axis of said rod, a pair of relatively spaced vertically disposed trap guns mounted on the free end of said bracket arm and having their barrels disposed downwardly, a guide arm mounted beneath said bracket arm for rotation therewith a rod slidably mounted on said guide arm, and means operatively connecting said rod with the triggers of said trap guns for simultaneously tripping said triggers.

3. In a device of the charatcer described, a stake rod, vertically spaced arms mounted for horizontal movement on the stake rod, a trap gun including a trigger mounted on the upper one of said arms, a bait hook slidably connected with the lower one of said arms, and motion transmitting means connecting said bait hook with said trigger of the trap gun.

PAUL B. HASS.